United States Patent [19]

Kahn et al.

[11] 4,356,195
[45] Oct. 26, 1982

[54] FRUIT JUICES HAVING A DEPRESSED FREEZING POINT

[75] Inventors: Marvin L. Kahn, Williamsville; John S. O'Mahony, Amherst, both of N.Y.

[73] Assignee: Rich Products Corporation, Buffalo, N.Y.

[21] Appl. No.: 168,903

[22] Filed: Jul. 14, 1980

[51] Int. Cl.³ .................... A23L 2/00; A23L 2/02; C12P 19/02; C12P 19/24

[52] U.S. Cl. .................................... 426/51; 426/52; 426/590; 426/599; 435/94; 435/105

[58] Field of Search ............... 426/51, 52, 599, 616, 426/442, 615, 61; 435/105, 201, 94, 234, 174

[56] References Cited

U.S. PATENT DOCUMENTS

| | | | |
|---|---|---|---|
| 1,309,979 | 7/1919 | Booker | 426/48 |
| 1,437,816 | 12/1922 | Paine et al. | 426/48 |
| 1,465,459 | 8/1923 | Walton | 435/105 |
| 1,467,599 | 9/1923 | Gore | 426/48 |
| 1,534,166 | 4/1925 | Dahlberg | 426/48 |
| 2,140,043 | 12/1938 | Zarotschenzeff | 426/639 |
| 2,418,558 | 4/1947 | Schloessinger et al. | 426/52 |
| 3,236,658 | 2/1966 | Little | 426/567 |
| 3,554,766 | 1/1971 | Engel | 426/307 |
| 3,689,362 | 9/1972 | Takasaki | 435/94 |
| 3,715,277 | 2/1973 | Dinelli et al. | 435/182 |
| 3,788,945 | 1/1974 | Thompson | 435/105 |
| 4,146,652 | 3/1979 | Kahn et al. | 426/564 |
| 4,154,863 | 5/1979 | Kahn et al. | 426/553 |

FOREIGN PATENT DOCUMENTS 54-73437  5/1979  Japan .................................. 435/105

OTHER PUBLICATIONS

Smolensky, D. C. et al., J. Sci. Food Agr. 1975, vol. 26, No. 10, pp. 1523-1528.

Primary Examiner—Raymond N. Jones
Assistant Examiner—Elizabeth J. Curtin

[57] ABSTRACT

Fruit juices having a depressed freezing point are obtained by treating the juice with an enzyme suited for converting a portion of naturally present sucrose and or glucose into fructose. Frozen concentrated solutions of such juices are conveniently handled and readily reconstituted. When fructose is generated within whole fruit or within segments of fruit (as by inoculation with enzyme) the taste may be improved and the fruit may be subjected to freezing temperatures without suffering damage.

20 Claims, 6 Drawing Figures

Conversion of Sucrose to Glucose and Fructose by Invertase in 11·6° Brix Orange Juice Held at 7°C Conversion of Sucrose to Glucose and Fructose by Invertase in 44° Brix Orange Juice Held at -18°C

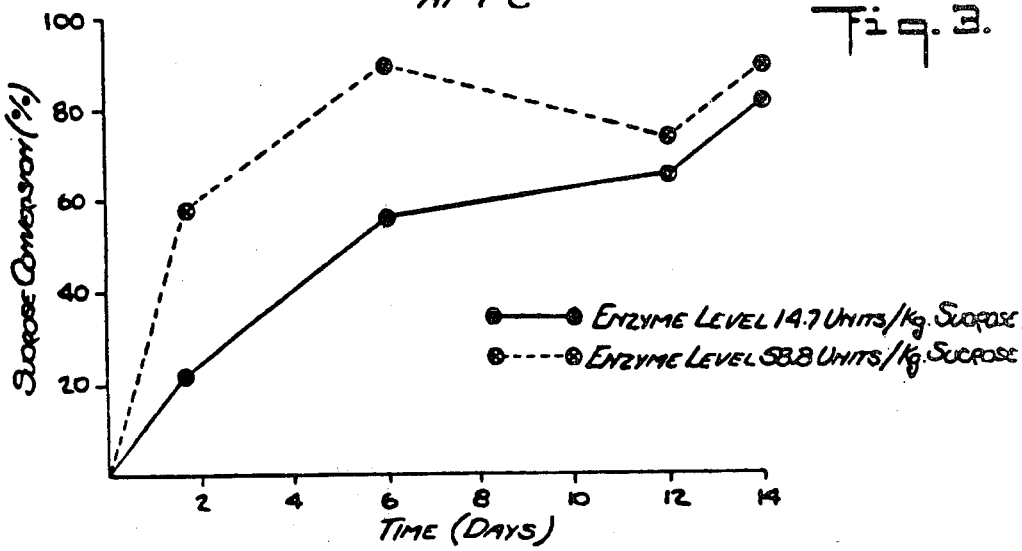
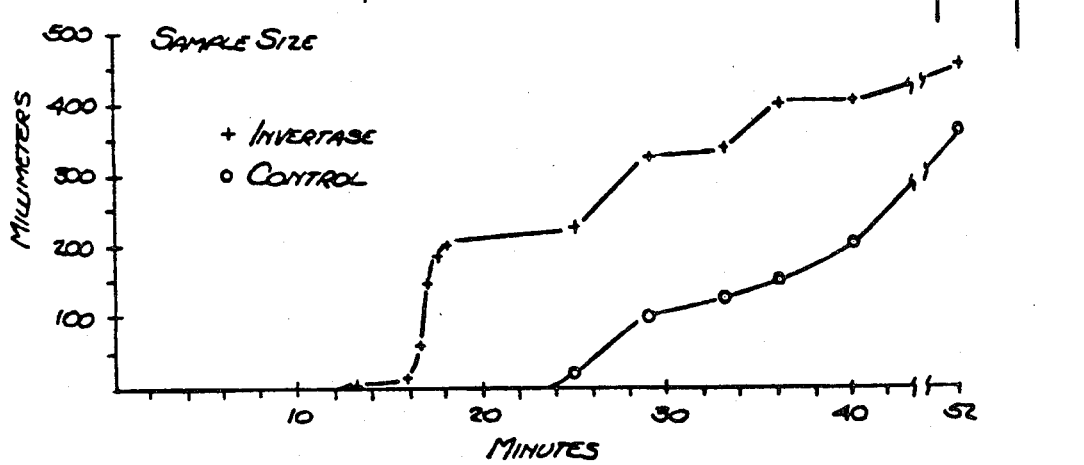

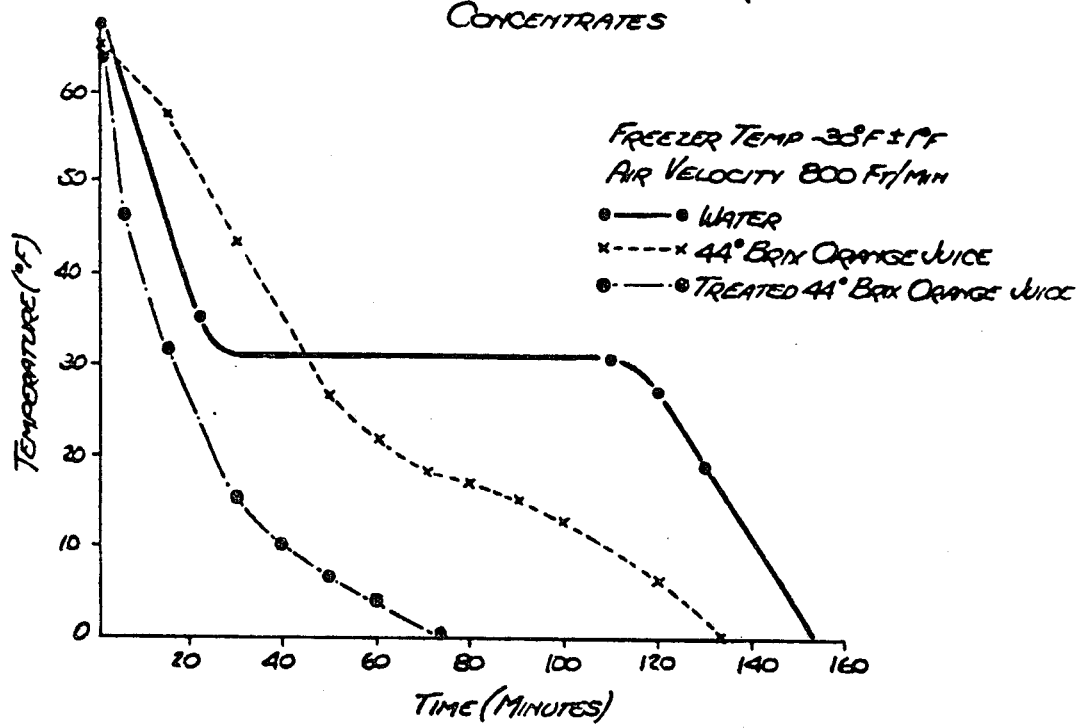
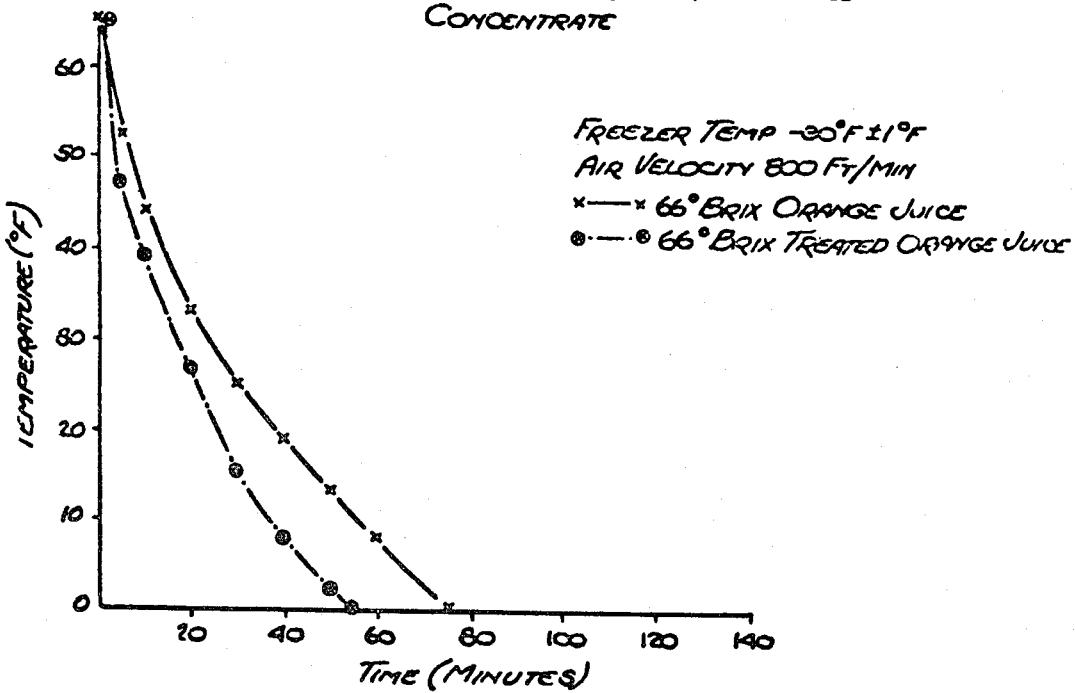

FRUIT JUICES HAVING A DEPRESSED FREEZING POINT

According to the present invention improved fruit juices containing increased levels of fructose are obtained by the enzymatic conversion of other sugars into fructose. According to one embodiment of the invention the sucrose in fruit juices is enzymatically cleaved to generate equal molar quantities of glucose and fructose. This reaction is conveniently accomplished with the enzyme invertase (beta fructofuranosidase). According to another embodiment of the invention the glucose present in fruit juices is enzymatically isomerized into fructose using the enzyme glucose isomerase.

The invention yields juices with improved flow properties and depressed freezing points. For example, 44° Brix orange juice concentrate having a depressed freezing point and greater fluidity at 5° F. than its untreated counterpart is obtained. Treated juices may also have improved taste properties and uniformity of flavor between varying batches of fruit may be achieved. Important energy savings are realized in the manufacture of the treated concentrate as opposed to untreated concentrate, there being no need to remove the latent heat of fusion to reach a convenient storage temperature, and the ease of reconstituting the easily flowing concentrate is of special convenience to the consumer or other end-user. Other advantages of the invention include the possibility of bringing a more concentrated juice concentrate to market with concomitant savings in packaging, storage and transportation. For example, a 56° Brix orange juice concentrate, as opposed to the standard 44° Brix concentrate now on the market, would become feasible. Moreover, bulk transportation of concentrate orange juice of 66° Brix could be facilitated at normal refrigeration temperatures, since, as will be appreciated by those skilled in the art, the replacement of sucrose with glucose and fructose results in lower water activity and increased microbial stability. Further, the hydrolysis of sucrose into glucose and fructose requires the addition of one water molecule for every sucrose molecule which is cleaved. The result is that this water becomes part of the soluble solids content of the treated juice. Thus, the net result of the hydrolysis of sucrose into glucose and fructose is an increase in the soluble solids content of the treated juice.

In another embodiment of this invention, treatment of the juice within whole fruits or segments of fruits may be accomplished thus raising the fructose content of the fruit and thereby enhancing flavor and permitting lower temperature handling than might otherwise be possible.

BACKGROUND OF THE INVENTION

The use of invertase to invert sucrose to fructose and glucose is a known reaction. See, for example, U.S. Pat. No. 1,465,459 wherein the inversion of sugar syrup is disclosed and U.S. Pat. No. 1,534,166 wherein invertase is used to prevent crystallization of beet molasses solution. Similarly the isomerization of glucose to fructose by an isomerase is known. See for example U.S. Pat. No. 3,689,362. Also, dates have been treated with invertase to inhibit sucrose crystallization. J. Sci. Food Agr., 1975, 26(10), 1523-28.

Fructose has previously been used as a sweetening agent for frozen desserts as disclosed in U.S. Pat. No. 3,236,658 and the use of invertase to make liquid center chocolate candies is also known. In the latter process, disclosed in U.S. Pat. No. 1,437,816, fruit pieces are enrobed with a sugar fondant in a mold form and allowed to cool and solidify. The fondant is then enrobed with chocolate. The fondant is prepared with invertase added which slowly hydrolyzes the sucrose to invert sugar during the normal storage of the candy. The invert sugar is more soluble than sucrose in the moisture of the fondant and thus becomes a liquid. Also, U.S. Pat. No. 4,154,863 at Col. 29 line 50 to Col. 30 line 25 discloses an orange juice concentrate made from ingredients including fructose-dextrose syrup.

BRIEF DESCRIPTION OF THE DRAWINGS

FIGS. 2 and 3 show the inversion of concentrated orange juice (44° Brix and 66° Brix, respectively).

FIG. 4 shows the time required for treated and untreated juice to flow from a 600 ml graduated cylinder after the cylinder was removed from 0° F. to room temperature.

FIGS. 5 and 6 are freezing curves for untreated and inverted samples of 44° Brix and 66° Brix orange juice concentrate.

DETAILED DESCRIPTION

Figure 1:
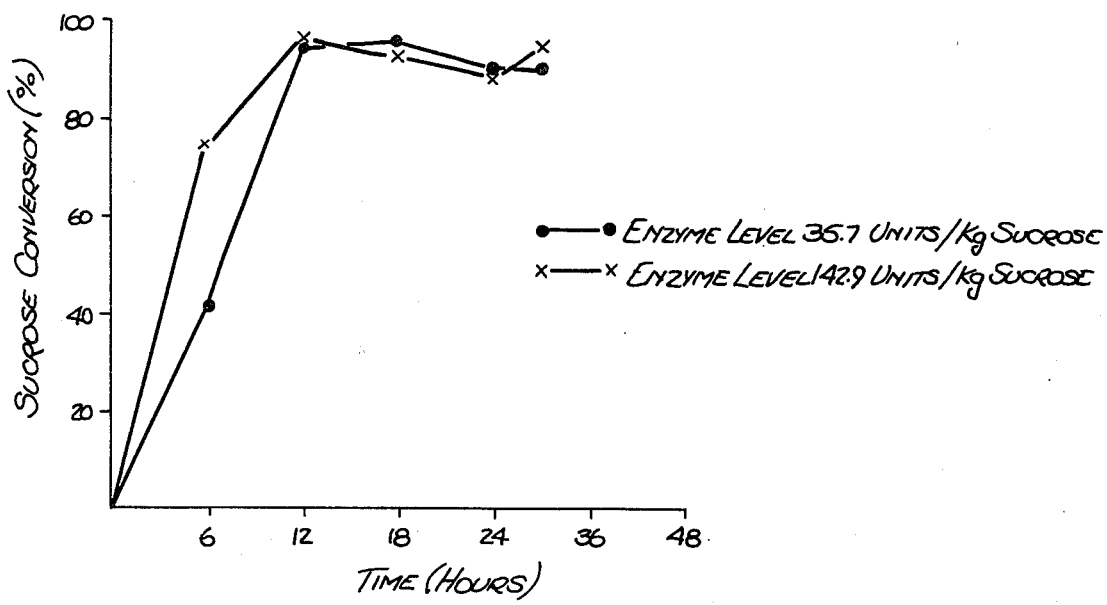
FIG. 1 shows the relationship between soluble invertase concentration and conversion time for fresh orange juice (11.6 Brix).

The present invention depends upon the enzymatic conversion of natural sugars contained in fruit juices into fructose. For example naturally present sucrose may be enzymatically converted into glucose and fructose using the enzyme invertase. Similarly naturally present glucose may be enzymatically converted into fructose using glucose isomerase. The former reaction involves the hydrolysis of sucrose according to the following equation:

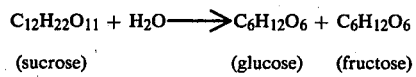

$$C_{12}H_{22}O_{11} + H_2O \longrightarrow C_6H_{12}O_6 + C_6H_{12}O_6$$
$$\text{(sucrose)} \qquad\qquad \text{(glucose)} \quad \text{(fructose)}$$

These reactions may be catalyzed by the addition of the enzymes alpha glucosidase or beta fructofuranosidase, also known as invertase. This latter enzyme has been designated by the International Union of Biochemistry Enzyme Commission as EC No. 3.2.1.26. In another embodiment mixtures of enzymes may be used. With such a mixture sucrose can be converted to glucose plus fructose and the glucose can be further converted to fructose.

The enzymes may be in either a soluble or insoluble form. Insoluble enzyme can be immobilized by being bound to a variety of inert carriers such as ceramic or glass beads, polystyrene or other support. Such immobilization can be accomplished by diverse means, including entrapment, encapsulation, absorption or covalent bonding. Commercial applications of such bound enzymes are described in U.S. Pat. No. 3,715,277.

The reaction may be performed in either a batch or continuous process and either method may be performed using soluble or insoluble enzymes. The only requirement is that the temperature dependent contact time between the enzyme and the sugar being converted to fructose be sufficient to insure sufficient fructose formation to impart to the treated juice the benefits of this invention.

By way of example and not limitation, juice may advantageously be treated by continuous passage of heated fruit juices through a column containing insoluble invertase bound to a carrier. Such a column would permit a residence time sufficient to insure a desired degree of inversion at the temperature employed.

Juices, the sucrose of which may effectively be inverted by the present invention, include, without limitation, orange juice, grapefruit juice, raspberry juice, plum juice, peach juice, apricot juice, honeydew melon juice, pineapple juice, and other juices possessing a high natural ratio of sucrose to fructose and preferably containing at least 1% sucrose based on the weight of the fresh fruit.

Juices, the glucose of which may be effectively isomerized according to the present invention include those juices having greater than 2% glucose based on the weight of the fresh fruit. Such juices may include without limitation orange juice, blackberry juice, grape juice, pineapple juice, apple juice, apricot juice, cranberry juice and plum juice.

In another embodiment of this invention, whole fruits or segments of fruits may be treated. Fruits and/or segments thereof to be treated may be inoculated with enzyme adapted to increase fructose content using any conventional method by which liquids and/or solids can be introduced within a fruit or fruit segment. For example, see U.S. Pat. No. 2,418,558 Col. 6 lines 55-66 wherein a method of treating whole beets with invertase is disclosed. As further examples, and not by way of limitation, fruit or segments may be inoculated by hypodermic needle, air injection, or by soaking in a transporting fluid (such as DMSO). Another method of inoculating fruit might consist of propelling small pellets containing solid enzyme into the fruit. Alternatively, prior to soaking of the fruit in an enzyme containing solution, a portion of the skin or peel of the fruit may be removed or holes punctured therein.

The treatment of fruit segments may be facilitated by soaking the segments in a juice to which enzyme has been added. This is a particularly advantageous method of treating segments which are to be packaged in juice or in a syrup, such as fruit cocktail. The segments may be placed in either their own juice, to which enzyme has been added, or in treated juice from another fruit or in a treated syrup. By way of example and not limitation, grapefruit segments might be placed in either grapefruit juice, orange juice, or mixtures thereof, and an enzyme added to the juice to increase the fructose content of the juice according to the invention. The juice within the fruit segment will then also increase in fructose content.

Fruits may vary in the ease with which the sugars therein may be converted into fructose with a given treatment. However, the sucrose in grapefruit is readily cleaved with invertase while oranges require a more lengthy treatment.

When the natural sucrose is cleaved into glucose and fructose, a lowering of freezing point occurs. At a given temperature such a product, with its sugars in an unconverted state, would be frozen. However, with its natural sucrose cleaved such a product has had its freezing point depressed, so that at subfreezing temperature it retains liquid character.

The enzymatically assisted formation of fructose in fruit juice will proceed under a wide range of temperature and enzyme concentration conditions. The important factor is that the enzyme be present in an amount to effectively catalyze the formation of fructose at the reaction temperature being employed within a convenient time frame.

As is appreciated by those skilled in the art, the speed with which commercially available enzyme will catalyze the hydrolysis of sucrose is specified by the enzyme supplier. Thus, the adjustment of enzyme concentration for a particular process is facilitated for the artisan.

Similarly, the temperature at which the process may be effective varies widely. It may be convenient to perform the temperature-dependent process at ambient temperature or to perform the process at an elevated temperature and employ a shorter reaction time. However, any convenient temperature may be employed. The process may be carried out on juices in a frozen state. Above a certain temperature, however, as will be readily appreciated by those skilled in the art, fruit juices are susceptible to the generation of "off" flavors and enzyme deactivation may occur. Hence, generally the preferred reaction temperature will be below about 85° C. and above about $-20°$ C., a temperature between about 5° to 30° is convenient. Similiarly the pressure may be varied in accordance with known techniques, to facilitate the reaction or to concomitantly concentrate the juice.

The degree of inversion may be readily monitored by periodic sampling and measuring the content of non-reducing sugars, i.e., sucrose. (Reducing sugars are defined as sugars with a free aldehyde or ketone group. All monosaccharides, such as glucose and fructose, are reducing sugars. Some disaccharides are non-reducing, such as sucrose, while maltose and lactose are reducing dissaccharides.). Reducing and nonreducing sugars can be measured by an analytical procedure such as the American Association of Cereal Chemists method 80.60. By measuring the content of both sugars, the conversion of sucrose (a non-reducing sugar) to glucose and fructose (reducing sugars) can be followed.

To monitor the isomerization of glucose into fructose periodic sampling may likewise be employed. In this case the course of the isomerization may be followed using high pressure liquid chromatography.

Further testing may also be used to monitor the changes in flow properties at freezer temperatures. Such a procedure, for example, is outlined in U.S. Pat. No. 4,154,863 at Col. 5 line 65 to Col. 6 line 14.

The degree of conversion of sucrose and/or glucose into fructose contemplated by the present invention is dependent upon the requirements of the treated product. If maximum freezing point depression is desired, then a high level of fructose will be important. If a lesser freezing point depression is desired, then a lesser level of fructose will suffice. Inversion percentages of from less than 0.5% to 100% of the sucrose content may thus be utilized according to the present invention, but preferably at least 25% and usually at least 50% of the sucrose will be inverted. Similarly, isomerization of from about 0.5% of glucose content into fructose may be utilized, but preferably at least 25% and usually at least 50% of the glucose will be isomerized.

The amount of enzyme employed can vary widely. Up to a certain level, lesser concentrations of soluble enzyme require a longer time for conversion. However, once a certain concentration of enzyme is present, additional enzyme is of little or no benefit in reducing reaction time.

In another embodiment of this invention any sucrose and/or glucose containing solution can be enzymatically treated in order to increase fructose content. For example, beverages such as vegetable juices, mixtures of various vegetable juices, tomatoe juice, sugar-containing tea beverages, cola beverages, and beverages such as lemonade and limeade, which contain added sugar, may be treated in accordance with the previously described techniques in order to convert the sucrose therein into glucose plus fructose and/or to convert the glucose therein into fructose.

Moreover since the treatment of various beverages with enzyme requires no special equipment and can take place under widely varying conditions of temperature and enzyme concentration, the enzymatic treatment of beverages to increase fructose content by the consumer is possible. As will be readily appreciated by those skilled in the art, in addition to the previously described benefits of the invention, enzymatic clevage of sucrose and/or conversion of glucose to fructose in beverages prior to consumption would be of special benefit to diabetics and others on a limited sucrose and/or glucose diet.

One aspect of this invention comprises making microbiologically stable beverage concentrates and other products which are described in U.S. Pat. No. 4,154,863. See also Ser. No. 24,127 filed Mar. 26, 1979 directed to beverage concentrates. For example, the microbiologically stable beverage concentrates comprise from about 35 to 45 percent water, sugar in a ratio to water of from about 1.2–1.8; provided that the solutes content is adequate to provide the product with a water activity of from about 0.75 to 0.90, and the amount of fructose plus other reducing sugars is from about 75 to 100% based on the total sugar content and the amount of fructose is at least 10 percent, and preferably at least 25 percent of the total sugar content, and wherein the product is adapted to provide a beverage concentrate which will flow at about 10° F., or which is spoonable at that temperature. Further details on the composition and characteristics of such flowable and spoonable products are set forth in U.S. Pat. No. 4,154,863 and Ser. No. 24,127 which are hereby incorporated by reference.

The relationship between soluble invertase concentration and conversion time for fresh orange juice (11.6° Brix) is seen in Table 1 which is plotted in FIG. 1.

TABLE 1

| 11.6° BRIX ORANGE JUICE[1] | | | | |
|---|---|---|---|---|
| Added Enzyme (Units/Kg sucrose)[2] | Time | Reducing Sugar (%) | Non-Reducing (%) | Inversion % |
| 0 | | 4.4 | 5.6 | — |
| 35.7 | 6 hr | 6.0 | 3.3 | 41 |
| 142.9 | 6 hr | 8.0 | 1.4 | 75 |
| 35.7 | 12 hr | 9.1 | 0.3 | 95 |
| 142.9 | 12 hr | 9.6 | 0.3 | 95 |
| 35.7 | 18 hr | 9.5 | 0.2 | 96 |
| 142.9 | 18 hr | 9.4 | 0.5 | 91 |
| 35.7 | 24 hr | 9.2 | 0.6 | 89 |
| 142.9 | 24 hr | 9.3 | 0.7 | 87 |
| 35.7 | 30 hr | 9.3 | 0.5 | 91 |
| 142.9 | 30 hr | 9.9 | 0.3 | 95 |
| 17.85 | 48 hr | 10.4 | 0.3 | 95 |
| 71.45 | 48 hr | 10.6 | 0.1 | 98 |

[1] All samples were stored at 7° C. for the duration of the experiment.
[2] 1 Unit of Activity of Enzyme = 425.4 mg sucrose inverted per ml of invertase per minute at 25° C. at 3.65 pH.
pH: Control = 3.65 Sample with 71.45 units invertase/kg sucrose = 3.62

The examples reported in Table 1 were performed as follows. Three aliquots containing 2000 g of 11.6° Brix (single strength) orange juice were taken. One aliquot was a control. The two levels of added enzyme represent the addition of 4 mls and 16 mls of Fermco Biochemics 0.30 K enzyme activity invertase solution. The products were stored in a refrigerator at 7° C. for 48 hours and were removed and analyzed for reducing and non-reducing sugars at six hour intervals during this 48-hour period.

Figure 2:
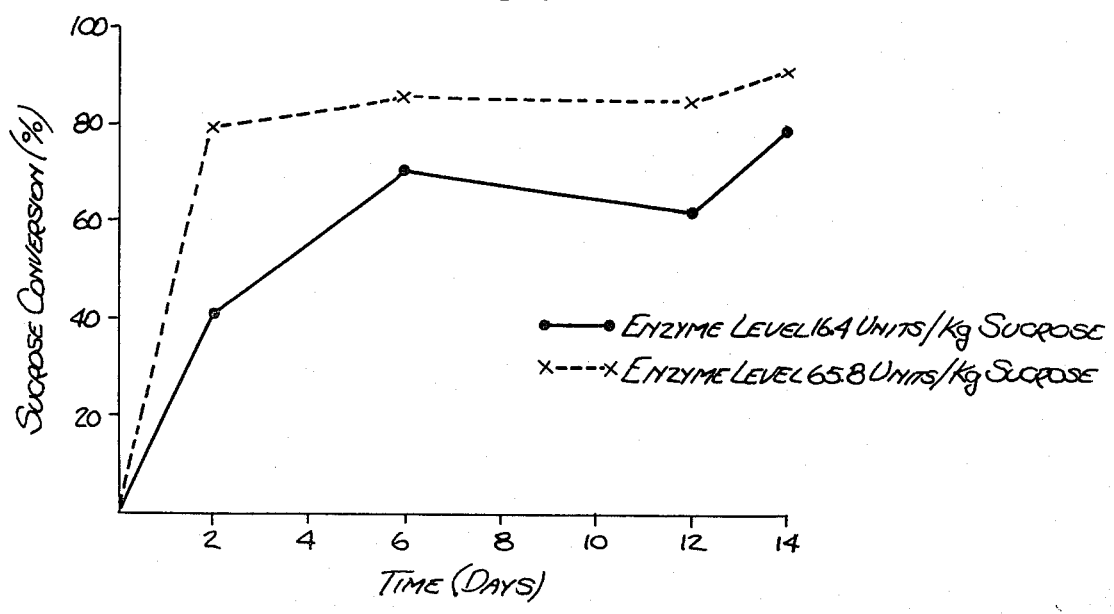

Tables 2 and 3 show the inversion of concentrated orange juices, the concentrations being 44° Brix and 66° Brix respectively. This data appears graphically in FIGS. 2 and 3.

TABLE 2

| 44° BRIX ORANGE JUICE[1] | | | | |
|---|---|---|---|---|
| Added Enzyme (Units/Kg sucrose)[2] | Time | Reducing Sugar (%) | Non-Reducing (%) | Inversion % |
| 0 | 48 hr | 19.8 | 24.5 | — |
| 16.4 | 48 hr | 27.4 | 14.1 | 42 |
| 65.8 | 48 hr | 35.9 | 5.1 | 79 |
| 0 | 144 hr | 20.9 | 24.0 | — |
| 16.4 | 144 hr | 36.5 | 7.0 | 71 |
| 65.8 | 144 hr | 38.3 | 3.4 | 86 |
| 0 | 288 hr | 15.8 | 15.9 | — |
| 16.4 | 288 hr | 25.7 | 6.1 | 62 |
| 65.8 | 288 hr | 30.1 | 2.4 | 85 |
| 0 | 336 hr | 21.7 | 26.5 | — |
| 16.4 | 366 hr | 43.9 | 5.8 | 79 |
| 65.8 | 366 hr | 44.9 | 2.4 | 91 |

[1] All samples were stored at −18° C. for the duration of the experiment.
[2] 1 Unit of Activity of Enzyme = 425.4 mg sucrose inverted per ml invertase per minute at 25° C. at 3.65 pH.
High pressure liquid chromatographic analysis (44% solids basis) were run at the conclusion of the test in order to verify the wet chemistry. The results were as follows:

| | Control | 65.8 Units invertase/kg sucrose |
|---|---|---|
| Water Activity | 0.937 | 0.912 |
| Fructose | 11.7 | 21.1 |
| Glucose | 10.9 | 19.4 |
| Sucrose | 19.8 | 0.8 |
| % Inversion | — | 96% |

The examples reported in Table 2 were performed as follows. Three aliquots of 2000 g of 44° Brix orange juice concentrate were taken. One aliquot served as a control. The two levels of added enzyme represent the addition of 8 mls and 32 mls of Fermco Biochemics 0.30K enzyme activity invertase solution. The samples were stored in a freezer at −18° C. for 14 days and removed periodically and analyzed for reducing and non-reducing sugars. The control and the sample containing 32 mls of added enzyme were analyzed at the end of 14 days by high pressure liquid chromatography to verify the wet chemical analysis.

Similarly, the examples in Table 3 represent 2000 g aliquots or orange juice concentrate, in this case of 66° Brix. Again, one aliquot was a control. The added enzyme was the same as in Table 2, but the two enzyme levels represent the addition of 11 mls and 44 mls of the commercial enzyme solution. The products were mixed with a whisk and stored at 7° C. for 14 days, being removed periodically for analysis. At the end of the 14 days, the control and the sample containing 44 mls of added enzyme solution were subjected to high pressure liquid chromatography to verify the wet chemical analysis.

TABLE 3

| 66° BRIX ORANGE JUICE[1] | | | | |
|---|---|---|---|---|
| Added Enzyme (Units/Kg sucrose)[2] | Time | Reducing Sugar (%) | Non-Reducing (%) | Inversion % |
| 0 | 42 hr | 27.7 | 37.4 | — |
| 14.7 | 42 hr | 34.5 | 29.3 | 22 |
| 58.8 | 42 hr | 44.8 | 15.6 | 58 |

TABLE 3-continued

66° BRIX ORANGE JUICE[1]

| Added Enzyme (Units/Kg sucrose)[2] | Time | Reducing Sugar (%) | Non-Reducing (%) | Inversion % |
|---|---|---|---|---|
| 0 | 144 hr | 29.9 | 35.2 | — |
| 14.7 | 144 hr | 49.4 | 15.8 | 56 |
| 58.8 | 144 hr | 59.2 | 3.8 | 89 |
| 0 | 288 hr | 23.8 | 27.8 | — |
| 14.7 | 288 hr | 43.9 | 9.6 | 65 |
| 58.8 | 288 hr | 44.3 | 7.4 | 73 |
| 0 | 336 hr | 33.1 | 35.4 | — |
| 14.7 | 336 hr | 62.3 | 6.9 | 81 |
| 58.8 | 336 hr | 66.8 | 3.8 | 89 |

[1]All samples were stored at 7° C. for the duration of the experiment.
[2]1 Unit of Activity of Enzyme = 4.25.4 mg sucrose inverted per ml invertase per minute at 25° C. at 3.65 pH.

High pressure liquid chromatographic analysis (66% solids basis)

|  | Control | 58.8 Units invertase/kg sucrose |
|---|---|---|
| Water Activity | 0.820 | 0.775 |
| Fructose | 19.9 | 31.9 |
| Glucose | 16.2 | 29.6 |
| Sucrose | 29.8 | 1.7 |
| % Inversion | — | 94% |
| PH | 3.50 | 3.40 |

The effect which inversion has on flow properties is to an extent dependent on concentration. This is seen in FIG. 4. This figure compares the flow rate of inverted 44° Brix orange juice concentrate against a control sample. The treated sample was prepared by adding 32 mls of 0.30K activity invertase solution to 2000 g of 44° Brix concentrate. The sample was then held at 0° F. for 216 hours. FIG. 4 plots the time required for treated and control juice to flow from a 600 ml graduated cylinder, after the cylinder was removed from 0° F. to room temperature. During the course of the one hour flow test the samples warmed from about 2° F. to about 53° F. As seen in FIG. 4, inversion significantly affects the flow properties of 44° Brix orange juice concentrate. This change in flow properties was not observed in a sample of the more concentrated 66° Brix orange juice concentrate; perhaps as a result of the lower water content and excessive viscosity caused by the orange juice pulp in the more concentrated juice.

It should, however, be noted that as is shown in Table 3 the treated 66° Brix concentrated has lower water activity than the untreated 66° Brix concentrate.

FIGS. 5 and 6 are freezing curves for control and inverted samples of 44° Brix and 66° Brix orange juice concentrate. For reference purposes a freezing curve for water is also depicted. The treated samples of the 44° Brix juice depicted in FIG. 5 is the same sample as that for which data is plotted in FIG. 4. The treated sample depicted in FIG. 5 was prepared by adding 44 mls of 0.30K enzyme activity invertase to 2000 g of 66° Brix concentrate. The sample was stored at 7° C. At the time the freezing plot was made, both treated samples had been in contact with the invertase for 168 hours. FIG. 5 shows a significant increase in cooling rate and consequent reduction in cooling time for treated as opposed to untreated 44° Brix orange juice concentrate. The freezing curves for 66° Brix orange juice concentrate shown in FIG. 6, while less dramatic, are however noteworthy.

The energy impact of these cooling curves is evident from Table 4, the energy saving for 44° Brix juice being quite pronounced.

TABLE 4

ENTHALPY OF ORANGE JUICE CONCENTRATES

|  | Regular[2] | Treated[3] | % Decrease |
|---|---|---|---|
| Orange Juice 44° Brix | 74 | 27.3 | 63 |
| Orange Juice 66° Brix | 55 | 39.6 | 28 |
| Water | 108 | — | — |

[1]All products are cooled from 66° F. to 0° F. Units are Kcal/Kg. (1.0 Kcal/Kg. = 1.8 BTU/lb.)
[2]Regular juice data from Dickerson, Relationship between Water Content, Enthalpy, specific heat and thermal difusivity of Foods, ASHRAE Transactions 1977, Vol. 83 Part 1 pp. 525–532.
[3]The data for the treated sample was derived from relative areas under the cooling curves (FIGS. 6 and 7).

The embodiment of this invention involving inoculation of whole fruit as exemplified by oranges and grapefruits is seen in Table 5. For comparison, Table 5 also included runs made with samples containing canned and bottled grapefruit juice. The oranges in Table 5 were fresh whole oranges which were inoculated with 2 ml of a 10% invertase solution by means of a sterile syringe. This solution had an enzyme activity of 0.03K, one-tenth the concentration employed in the examples found in Tables 1–3. One k (unimolecular reaction velocity constant) equals 2850 mg of sucrose inverted per minute at 25° C. per gram of enzyme preparation.

Two oranges were inoculated with a single stab and two were inoculated with multiple stabs. An orange was also set up as a control inoculated with 2 ml of water. The oranges were held at room temperature (70° F.) for 4 days, and were then squeezed and the juices analyzed for reducing and non-reducing sugars.

Similarly, the grapefruits were fresh whole grapefruits which were inoculated with 2 ml of invertase (0.30K enzyme activity) and the holes were sealed with sterile beeswax to prevent microbial action. The invertase treated grapefruit and the control grapefruit were left at room temperature (70° F.) for up to 6 days. The grapefruit were then squeezed and the juice was analyzed every three days for reducing a non-reducing sugars.

TABLE 5

| SAMPLE | Brix | pH | Reducing Sugar (%) | Non-Reducing (%) | Inversion (%) |
|---|---|---|---|---|---|
| Inoculated Oranges |  | — |  |  |  |
| Control 96 hr | 12.0 |  | 5.5 | 5.6 | — |
| Single injection 96 hr | 15.0 | — | 8.4 | 5.5 | 21 |
| Multiple injection 96 hr | 14.8 | — | 9.6 | 4.1 | 42 |
| Grapefruit Juice-retail can |  |  |  |  |  |
| Control 24 hr | 10.0 | 3.20 | 6.9 | 0.4 | — |
| Sample w/invertase (0.8 ml invertase/100 ml) | 10.2 | 3.25 | 6.8 | 0.4 | 0 |
| Grapefruit Juice-retail bottle |  |  |  |  |  |
| Control 72 hr | 9.6 | 3.20 | 3.8 | 2.9 | — |
| Sample/invertase 72 hr (0.8 ml invertase/100 ml) | 9.8 | 3.21 | 6.9 | 0.14 | 94 |
| Inoculated Grapefruit* Control | 10.5 | 3.50 | 5.2 | 2.6 | — |
| Fruit w/invertase 3 days | 10.1 | — | 6.8 | 1.7 | 40 |
| Fruit w/invertase 6 days (2 ml invertase/ | 8.7 | 3.70 | 4.6 | 1.5 | 25 |

TABLE 5-continued

| SAMPLE | Brix | pH | Reducing Sugar (%) | Non-Reducing (%) | Inversion (%) |
|---|---|---|---|---|---|
| grapefruit) | | | | | |

Activity of Enzyme = 425.4 mg. sucrose inverted per ml of invertase per minute at 25° C. at 3.65 pH.
*Amount squeezed grapefruit ranged from 150–190 grams.

The inoculation of fruit segments reported in Table 6 was carried out as follows:

Fresh oranges were peeled and segmented. Half of the segments were then squeezed for juice. The amount of enzyme necessary to meet the level of 0.8 ml enzyme (Fermco Biochemics 0.30K enzyme activity) per 100 grams of juice plus segments was added to one half of the juice. To this portion of the juice, half the segments were then added. The control consisted of the other half of the segments added to the remaining juice. The segments were held at 7° C. for 3 days. Then a segment was removed, squeezed, checked for solids, and run for reducing and non-reducing sugar. After 6 days, another segment was removed, squeezed, checked for solids and run for reducing and non-reducing sugar.

Because of the destructive nature of the test method used to generate the data found in tables 5 and 6, different fruits had to be used for each test. The ratio of non-reducing sugars to total sugars in the control sample was used as the expected value for the treated sample and the % inversion was calculated accordingly. For example, for the inoculated oranges found in table 5, the % inversion for the multiple injection 96 hr sample was calculated as follows:

$$\frac{\text{Non reducing sugar control}}{\text{Total sugar control}} = \frac{5.6}{11.1} = .51$$

$$.51 \times (\text{total sugars of treated sample}) = .51 \times 13.7 = 6.99$$

$$\frac{6.99 - (\text{measured non-reducing sugar treated sample})}{6.99}$$

$$\frac{6.99 - 4.1}{6.99} = .42$$

| | Reducing Sugar | Non-Reducing Sugar |
|---|---|---|
| Orange Juice 11° Brix No-Enzyme | 5.1% | 5.6% |
| Orange Juice 11° Brix Invertase Treated | 10.2% | 0.3% |

EXAMPLE 2

Orange juice concentrate at 44° Brix solids was treated with 2 mls of enzyme solution as in Example 1 and held at 140° F. for 20 hours. Analysis of the resulting products showed the following:

| | Reducing Sugar | Non-Reducing Sugar |
|---|---|---|
| Orange Juice No Enzyme | 24.0% | 17.0% |
| Orange Juice Invertase Treated | 37.3% | 3.2% |

At freezer temperature the treated juice flowed significantly better than the untreated sample.

EXAMPLE 3

Orange juice of a commercial concentration (66° Brix) solids was treated with 2 mls of enzyme solution as in Example 1 and held at 70° F. for 40 hours. Analysis of the resulting products showed the following:

| | Reducing Sugar | Non-Reducing Sugar |
|---|---|---|
| Orange Juice 66° Brix No Enzyme | 27.2% | 31.4% |
| Orange Juice 66° Brix Invertase Treated | 43.6% | 16.4% |

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will

TABLE 6

FRUIT SEGMENTS[1]

| | Control | | | 3 Days | | | | 6 Days | | | |
|---|---|---|---|---|---|---|---|---|---|---|---|
| Sample | Brix | Reducing | Non Reducing | Brix | Reducing | Non Reducing | % Inversion | Brix | Reducing | Non Reducing | % Inversion |
| Orange Segments | 13.2 | 4.9 | 5.6 | 11.2 | 5.1 | 4.0 | 20 | 11.1 | 4.9 | 3.8 | 20 |
| Grapefruit Segments | 9.8 | 4.2 | 3.6 | 9.9 | 6.5 | 1.3 | 64 | 10.2 | 7.4 | 0.2 | 94 |
| Pineapple Segments | 13.0 | 9.9 | 1.7 | 13.6 | 10.5 | 1.7 | 0 | 14.2 | 11.1 | 0.9 | 47 |

[1]Amount of enzyme added = 0.8 ml invertase/100 gm.
Activity of Enzyme = 425.4 mg sucrose inverted per ml invertase per minute at 25° C. at 3.65 pH.
Segments were in their own juices. Samples were stored at 7° C. for the duration of the experiment.

The following examples are set forth as illustrative of further approaches taken and, of course, may be varied in accordance with the spirit and scope of this description.

EXAMPLE 1

Single strength orange juice was treated with invertase at a level of 2 mls of Fermco Biochemics invertase (0.30K enzyme activity) solution per 100 g of product. The product was held at 70° F. for 5 hours. Analysis of the resulting product showed the following:

readily understand. Accordingly, such variations and modifications of the disclosed invention are considered to be within the purview and scope of this invention and the following claims.

We claim:

1. A process for making an improved fruit juice comprising the step of contacting said juice with an enzyme capable of converting a portion of the sucrose contained in said juice into fructose and glucose, said contacting being carried out under conditions suitable to effect said conversion, wherein said improved fruit juice has a water content of about 35% to about 65%, sugar in a ratio to water of about 0.8–2.0:1 and a water activity of below about 0.90.

2. Process according to claim 1 wherein said converting step is followed by the concentrating of said fruit juice.

3. Process according to claim 2 wherein said enzyme is selected from the group consisting of invertase and alpha glucosidase.

4. Process according to claim 3 wherein said fruit juice is selected from the group consisting of grapefruit juice and orange juice.

5. Process according to claim 1 wherein said enzyme is invertase said invertase being present in a soluble form.

6. Process according to claim 1 wherein said enzyme is invertase said invertase being present in an insoluble form.

7. Process according to claim 6 wherein said invertase is bound to an inert carrier.

8. Process according to claim 2 wherein said concentrating results in a juice containing at least about 44° Brix solids.

9. Process according to claim 2 wherein said concentrating results in a juice containing at least about 66° Brix solids.

10. The method of making a microbiologically stable fruit juice concentrate which comprises the steps of mixing with the fruit juice at least one fructose-producing enzyme in an amount sufficient to provide a product in which the amount of fructose and other reducing sugars comprise at least 50 percent based on the total sugar content, wherein at least 10 percent of said sugar is fructose and maintaining said mixture of fruit juice and enzyme under conditions suitable for the conversion of sugars by said enzyme.

11. Method according to claim 10 wherein said enzyme is glucose isomerase.

12. Process according to claim 10 wherein said juice is a citrus juice.

13. A process for making an improved fruit juice from a fruit juice containing at least 1% by weight of sucrose comprising the steps of contacting said juice with invertase, said contacting being conducted at a temperature of between about 85° C. and −20° C., and maintaining said invertase in contact with said juice until at least about 50% of the sucrose contained in said juice is converted into fructose and glucose.

14. Process according to claim 13 wherein said fruit juice is selected from the group consisting of grape juice, pineapple juice, apple juice, blackberry juice, plum juice, cranberry juice and apricot juice.

15. A process according to claim 13, wherein said contacting is conducted at a temperature of approximately −18° C.

16. A process according to claim 13 wherein said contacting of said juice with enzyme is conducted using single strength juice.

17. A process according to claim 13 wherein said contacting of said juice with enzyme is conducted using juice of a concentration of at least about 44° Brix.

18. A process for making an improved beverage from a sucrose-containing solution comprising the steps of contacting said solution with an enzyme capable of converting a portion of the sucrose in said solution into fructose, said contacting being carried out under conditions suitable to effect said conversion, wherein said improved beverage comprises about 15 to 55% water, sugar in a ratio to water of about 0.8–2:1 and a solids content adequate to provide a water activity of about 0.8 to 0.9, and in said sugar the amount of dextrose plus fructose is at least about 50% based upon the total sugar content and at least 10% of said sugar is fructose.

19. Process according to claim 18 wherein said sucrose-containing solution is selected from the group consisting of fruit juice, vegetable juice, tomato juice, tea containing added sucrose, cola beverages, lemonade and limeade.

20. A process according to claim 18 wherein said sucrose-containing solution is fruit juice.

* * * * *

UNITED STATES PATENT AND TRADEMARK OFFICE
CERTIFICATE OF CORRECTION

PATENT NO. : 4,356,195
DATED : October 26, 1982
INVENTOR(S) : Marvin L. Kahn and John Sean O'Mahony It is certified that error appears in the above—identified patent and that said Letters Patent is hereby corrected as shown below:

Column 9, line 66, change "100g" to --1000g--.

Signed and Sealed this

First Day of November 1983

[SEAL]

Attest:

GERALD J. MOSSINGHOFF

Attesting Officer

Commissioner of Patents and Trademarks